(12) United States Patent
Bush et al.

(10) Patent No.: US 8,935,633 B2
(45) Date of Patent: Jan. 13, 2015

(54) PROVIDING CONTROLLED ACCESS TO THE USE OF ELECTRONIC DEVICES

(75) Inventors: Christopher L. Bush, Austin, TX (US); Didier Garcia, Miami, FL (US); Joshua F. Nedelka, Meriden, CT (US); Mark Rutenburg, Newington, CT (US)

(73) Assignee: International Business Machines Corporation, Armonk, NY (US)

( * ) Notice: Subject to any disclaimer, the term of this patent is extended or adjusted under 35 U.S.C. 154(b) by 702 days.

(21) Appl. No.: 12/331,861

(22) Filed: Dec. 10, 2008

(65) Prior Publication Data

US 2010/0146438 A1   Jun. 10, 2010

(51) Int. Cl.
| | |
|---|---|
| G06F 21/22 | (2006.01) |
| G06F 21/62 | (2013.01) |
| H04L 12/18 | (2006.01) |
| G06Q 10/10 | (2012.01) |
| H04L 29/06 | (2006.01) |

(52) U.S. Cl.
CPC .......... *G06F 21/629* (2013.01); *G06F 21/6209* (2013.01); *G06F 2221/2137* (2013.01); *G06F 2221/2149* (2013.01); *H04L 12/1818* (2013.01); *G06F 2221/2103* (2013.01); *G06Q 10/1095* (2013.01); *G06F 2221/2151* (2013.01); *H04L 63/102* (2013.01); *G06Q 10/109* (2013.01); *G06F 2221/2141* (2013.01)
USPC .......................................... 715/810; 709/207

(58) Field of Classification Search
USPC .............................. 715/762; 709/207; 705/301
See application file for complete search history.

(56) References Cited

U.S. PATENT DOCUMENTS

| | | | |
|---|---|---|---|
| 5,425,140 A | 6/1995 | Bloomfield et al. |
| 5,559,948 A | 9/1996 | Bloomfield et al. |
| 5,903,845 A | 5/1999 | Buhrmann et al. |
| 5,982,370 A | 11/1999 | Kamper |
| 6,189,026 B1 | 2/2001 | Birrell et al. |
| 6,201,859 B1 | 3/2001 | Memhard et al. |
| 6,269,369 B1 | 7/2001 | Robertson |
| 6,334,046 B1 | 12/2001 | Philipson et al. |
| 6,349,299 B1 | 2/2002 | Spencer et al. |
| 6,381,618 B1 | 4/2002 | Jones et al. |
| 6,484,182 B1 | 11/2002 | Dunphy |
| 6,587,876 B1 | 7/2003 | Mahon et al. |
| 6,640,230 B1 | 10/2003 | Alexander et al. |
| 6,661,436 B2 | 12/2003 | Barksdale et al. |

(Continued)

OTHER PUBLICATIONS

Actioneer, "Actioneer Press Release—Actioneer and IBM ViaVoice Speech-Enable Lotus Notes R5", Dec. 7, 1998, 3 pages.

(Continued)

*Primary Examiner* — Matt Kim
*Assistant Examiner* — William Trapanese
(74) *Attorney, Agent, or Firm* — Parashos T. Kalaitzis; Amy J. Pattillo

(57) ABSTRACT

A meeting controller provides controlled access to the use of an electronic device by sending a meeting request to at least one invitee, wherein the meeting request specifies access rights to use only at least one particular feature of multiple features of an electronic device accessible to the invitee during a scheduled time for the meeting. In response to the invitee accepting the meeting request, the electronic device is automatically configured to only provide access to the at least one particular feature allowed in the access rights specified in the accepted meeting request and during the scheduled time for the meeting, the invitee is only allowed use of the particular feature of the electronic device.

14 Claims, 6 Drawing Sheets

(56) References Cited

U.S. PATENT DOCUMENTS

| | | | |
|---|---|---|---|
| 6,687,362 B1 | 2/2004 | Lindquist et al. | |
| 6,697,942 B1 | 2/2004 | L'Heureux et al. | |
| 6,765,597 B2 | 7/2004 | Barksdale et al. | |
| 6,768,997 B2 | 7/2004 | Schirmer et al. | |
| 6,778,192 B2 | 8/2004 | Arbab et al. | |
| 6,806,888 B2 | 10/2004 | Bhogal et al. | |
| 6,961,858 B2 | 11/2005 | Fransdonk | |
| 7,020,635 B2 | 3/2006 | Hamilton et al. | |
| 7,080,049 B2 | 7/2006 | Truitt et al. | |
| 7,090,128 B2 | 8/2006 | Farley et al. | |
| 7,107,462 B2 | 9/2006 | Fransdonk | |
| 7,150,045 B2 | 12/2006 | Koelle et al. | |
| 7,197,321 B2 | 3/2007 | Erskine et al. | |
| 7,200,638 B2 | 4/2007 | Lake | |
| 7,587,502 B2 | 9/2009 | Crawford et al. | |
| 7,711,586 B2 | 5/2010 | Aggarwal et al. | |
| 8,015,497 B2 | 9/2011 | Chen et al. | |
| 8,107,922 B2* | 1/2012 | Itaya | 455/410 |
| 2001/0049617 A1 | 12/2001 | Berenson et al. | |
| 2002/0033880 A1* | 3/2002 | Sul et al. | 348/14.09 |
| 2002/0065630 A1 | 5/2002 | Dwyer et al. | |
| 2002/0099777 A1 | 7/2002 | Gupta et al. | |
| 2002/0194379 A1 | 12/2002 | Bennett et al. | |
| 2003/0014278 A1 | 1/2003 | Park et al. | |
| 2003/0046296 A1 | 3/2003 | Doss et al. | |
| 2003/0060223 A1 | 3/2003 | Takeda et al. | |
| 2003/0079024 A1 | 4/2003 | Hough et al. | |
| 2003/0093480 A1 | 5/2003 | Lagarde et al. | |
| 2003/0135659 A1 | 7/2003 | Bellotti et al. | |
| 2003/0158864 A1 | 8/2003 | Samn | |
| 2004/0012538 A1 | 1/2004 | Bhogal | |
| 2004/0019912 A1 | 1/2004 | Staack | |
| 2004/0024846 A1 | 2/2004 | Randall et al. | |
| 2004/0064696 A1 | 4/2004 | Daigle et al. | |
| 2004/0088648 A1 | 5/2004 | Kangas et al. | |
| 2004/0093317 A1 | 5/2004 | Swan | |
| 2004/0110543 A1 | 6/2004 | Mikan | |
| 2004/0117443 A1 | 6/2004 | Barsness | |
| 2004/0119756 A1 | 6/2004 | Kumhyr et al. | |
| 2004/0166878 A1 | 8/2004 | Erskine et al. | |
| 2004/0203895 A1 | 10/2004 | Balasuriya | |
| 2004/0205543 A1 | 10/2004 | Awada et al. | |
| 2004/0253963 A1* | 12/2004 | Park et al. | 455/456.2 |
| 2005/0015444 A1 | 1/2005 | Rambo | |
| 2005/0071430 A1 | 3/2005 | Kobayashi et al. | |
| 2005/0265531 A1* | 12/2005 | Mika | 379/201.01 |
| 2006/0046706 A1 | 3/2006 | Lin et al. | |
| 2006/0099965 A1* | 5/2006 | Aaron | 455/456.3 |
| 2006/0135140 A1* | 6/2006 | Rothman et al. | 455/418 |
| 2006/0160562 A1 | 7/2006 | Davis et al. | |
| 2006/0190547 A1* | 8/2006 | Bhogal et al. | 709/207 |
| 2007/0004386 A1 | 1/2007 | Singh et al. | |
| 2007/0067387 A1 | 3/2007 | Jain et al. | |
| 2007/0150583 A1 | 6/2007 | Asthana et al. | |
| 2007/0243862 A1 | 10/2007 | Coskun et al. | |
| 2007/0245026 A1* | 10/2007 | Martin et al. | 709/227 |
| 2008/0059567 A1* | 3/2008 | Williams et al. | 709/203 |
| 2008/0307340 A1 | 12/2008 | Kojima et al. | |
| 2010/0106628 A1* | 4/2010 | Ross et al. | 705/30 |
| 2010/0121666 A1* | 5/2010 | Niazi | 705/8 |
| 2010/0146499 A1 | 6/2010 | Bush | |

OTHER PUBLICATIONS

Nyamgondalu, "Lotus Notes Calendar and Scheduling Explained—Part 1", Oct. 19, 2004, 9 pages.

Nyamgondalu, "Lotus Notes Calendar and Scheduling Explained—Part 2", Oct. 25, 2004, 7 pages.

IBM Lotus, "About Notes R5", downloaded from www.lotus.com on Nov. 5, 2004, 3 pages.

ACL, downloaded from www.wlug.org on Oct. 10, 2004, 1 page.

IBM, "IBM Community Tools User's Manual", Mar. 2003, 58 pages.

Callaghan, "IBM Releases IM Community Tools", Aug. 11, 2003, 1 page.

Callaghan, "IM, Message Brokering United", e-Week, Aug. 18, 2003, 2 pages.

IMC, "vCard Overview", downloaded from www.imc.org on Nov. 24, 2004, 3 pages.

Versit "vCard—The Electronic Business Card, Version 2.1" Sep. 18, 1996, 52 pages.

Howes et al., "RFC 2425—A MIME Content-Type for Directory Information" Sep. 1998, 24 pages.

Dawson et al., "RFC 2426—vCard Mime Directory Profile" Sep. 1998, 31 pages.

Versit, "vCard: The Electronic Business Card, Ver. 2.1, A Versit Consortium White Paper", Jan. 2, 1997, 4 pages.

USPTO Office Action, mailing date Nov. 15, 2011, U.S. Appl. No. 12/332,071, filed Dec. 10, 2008, Christopher L. Bush, 42 pages.

USPTO Final Office Action, mailing date Jun. 25, 2012, U.S. Appl. No. 12/332,071, filed Dec. 10, 2008, Christopher L. Bush, 24 pages.

* cited by examiner

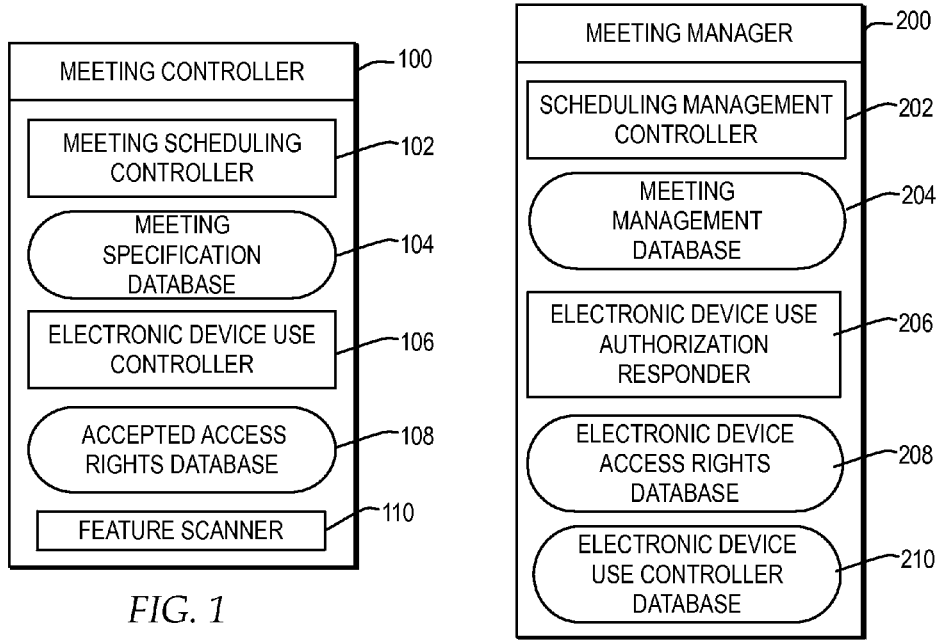
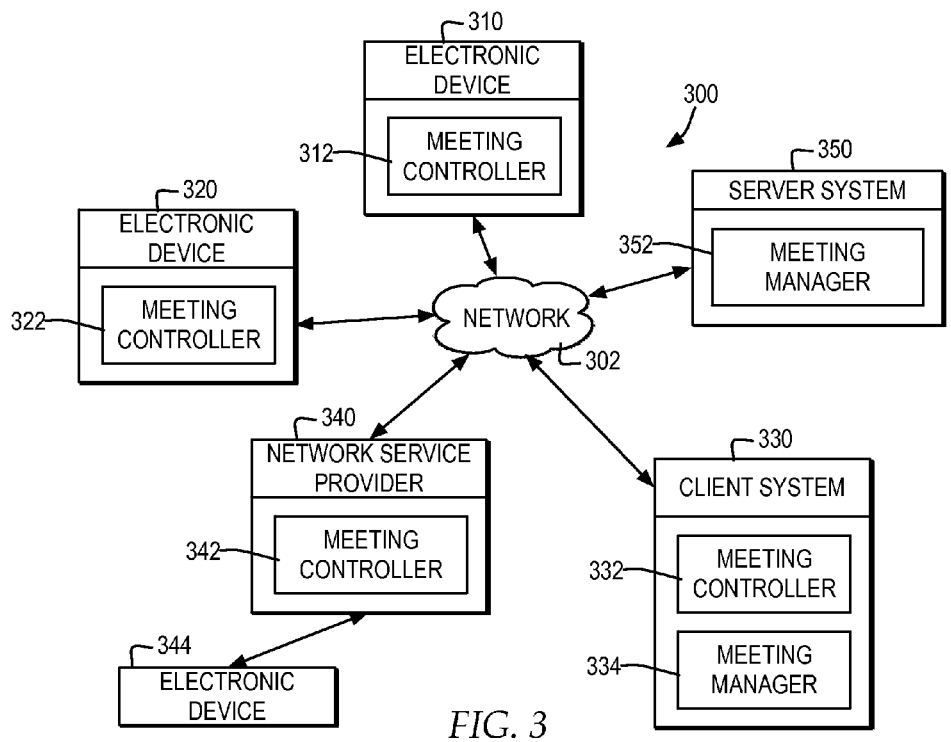

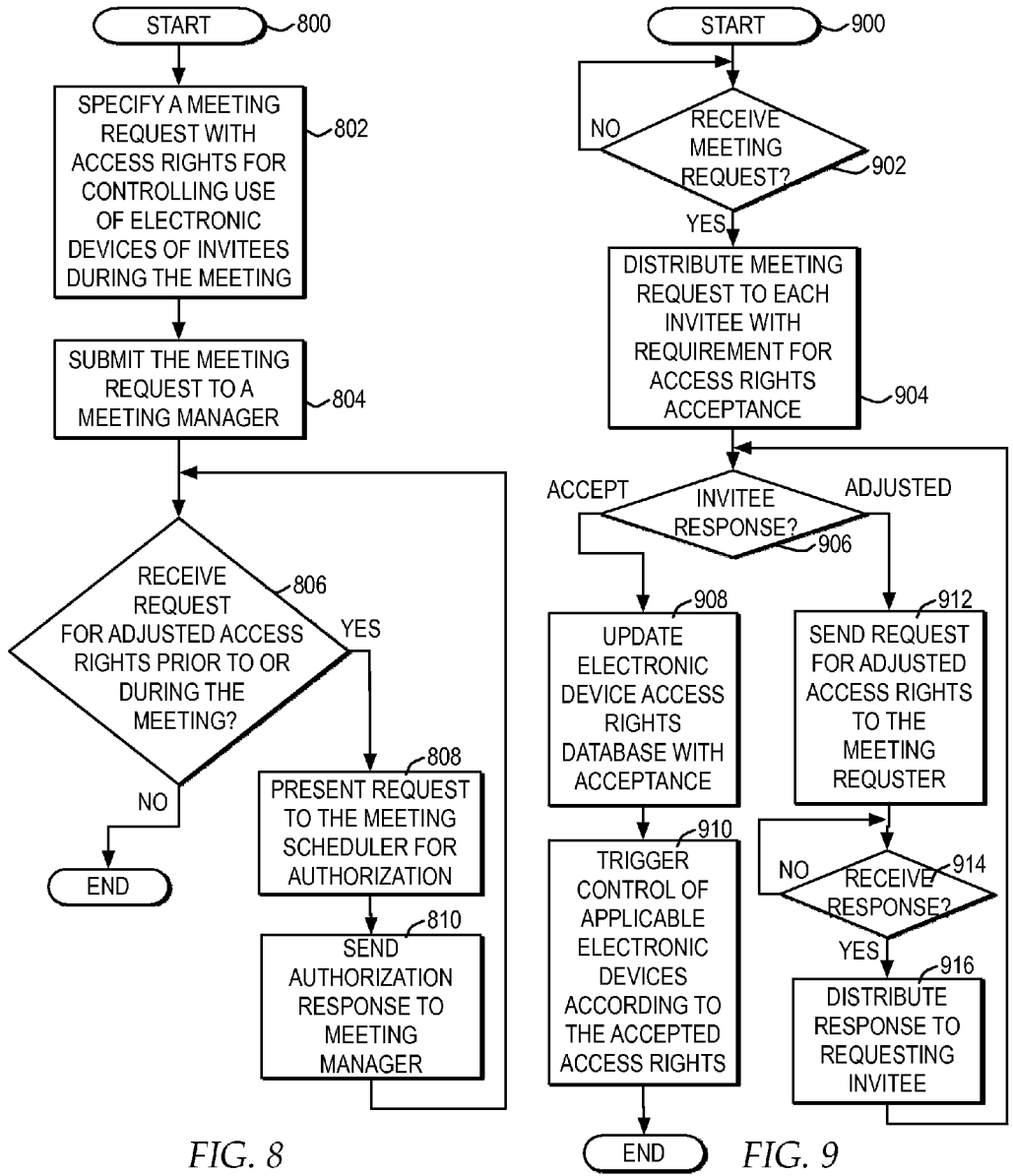

PROVIDING CONTROLLED ACCESS TO THE USE OF ELECTRONIC DEVICES

BACKGROUND

1. Technical Field

The present invention relates in general to restricted use of an electronic device, and more specifically to providing controlled access to the use of electronic devices during a meeting.

2. Description of the Related Art

With the prevalence of portable electronic devices, including laptops and personal communication devices, within the workplace and other places where people meet, there are increasing ways in which a person may remain connected and quickly access information. In addition, however, with the increasing prevalence of portable electronic devices within the workplace, there are also increasing ways in which a person may be distracted by incoming messages, calendar reminders, and other information and applications available via the electronic device.

In one example, an employee may use a laptop computer during a meeting to take notes or access research. While the employee use of the laptop may provide valuable information during a meeting, the employee may also be personally distracted from giving one's full attention to the meeting by alerts to incoming messages and other information updating on the employee's laptop. In some meetings, an occasional distraction for an employee to check email or do some research during the meeting may be acceptable. In other meetings, however, a presenter may require the attention of those attending the meeting.

SUMMARY

Therefore, in view of the foregoing, an embodiment of the invention provides a method, system, and computer program product for providing controlled access to the use of electronic devices during a meeting.

In one embodiment of the invention, a method in at least one computer system for providing controlled access to the use of an electronic device is directed to receiving a meeting request for a meeting with at least one invitee, wherein the meeting request specifies access rights to use only at least one particular feature of a plurality of features of an electronic device accessible to the at least one invitee during a scheduled time for the meeting and to block use of a remaining selection of features of the plurality of features of the electronic device. The method is directed to, responsive to receiving, at the electronic device, the meeting request, scanning the at least one electronic device associated with the at least one invitee to identify the plurality of features by requesting a configuration file from an operating system of the at least one electronic device and detecting the plurality of features of the electronic device from the configuration file, wherein the plurality of features comprise at least one hardware feature, at least one network feature, and at least one application feature. The method is directed to comparing, by the electronic device, the plurality of features with a selection of features specified for control by the access rights. The method is directed to identifying, by the electronic device, a first selection of features from among the selection of features matching the plurality of features, wherein the first selection of features are allowed for use during the meeting according to the access rights and a second selection of features from among the selection of features matching the plurality of features, wherein the second selection of features are disallowed from use during the meeting according to the access rights. The method is directed to displaying, by the electronic device, the first selection of features and the second selection of features in a meeting invitee interface. The method is directed to displaying, by the electronic device, within the meeting invitee interface, a first selectable option for the at least one invitee to accept the access rights and meeting request. The method is directed to displaying, by the electronic device, within the meeting invitee interface, a second selectable option for the at least one invitee to select at least one particular feature from among the second selection of features to request to add to the first selection of features. The method is directed to, responsive to the at least one invitee selecting the second selectable option and selecting the at least one particular feature, sending a request to a meeting manager for additional access rights with the at least one particular feature. The method is directed to, responsive to receiving a response from the meeting manager at the electronic device affirming the additional access rights, removing the at least one particular feature from the second selection of features, adding the at least one particular feature to the first selection of features, updating the display of the second selection of features to remove the at least one particular feature, and updating the display of the first selection of features to add the at least one particular feature. The method is directed to, responsive to the at least one invitee selecting the first selectable option to accept the meeting request, downloading, by the electronic device, a module specified by the meeting manager and required to be installed on the electronic device to enforce the access rights during the scheduled time for the meeting if the at least one invitee is detected as physically present at a particular location for the meeting, wherein the module is a controller. The method is directed to installing, by the electronic device, the module on the electronic device. The method is directed to detecting, by the module, from one or more input interfaces of the electronic device, whether the at least one invitee is currently physically present in the particular location for the meeting during the scheduled time for the meeting, wherein the electronic device is accessible to the invitee during the meeting and the electronic device is not used by the at least one invitee to connectively access the meeting. The method is directed to, responsive to the module detecting the at least one invitee is currently physically present in the particular location for the meeting during the scheduled time for the meeting, activating the module to configure the electronic device to only provide access during the scheduled time for the meeting to the at least one particular feature of the electronic device allowed in the access rights specified in the accepted meeting request. The method is directed to controlling, by the module, the electronic device to only allowing use of the at least one particular feature of the electronic device by the at least one invitee during the scheduled time for the meeting and blocking use of the at least one remaining features of the plurality of features of the electronic device not allowed in the access rights during the scheduled time for the meeting.

In another embodiment, a system for providing controlled access to the use of an electronic device comprises one or more processors, one or more computer-readable memories, and one or more computer-readable, tangible storage devices. The system comprises program instructions, stored on at least one of the one or more storage devices for execution by at least one of the one or more processors via at least one of the one or more memories, to receive a meeting request for a meeting with at least one invitee, wherein the meeting request specifies access rights to use only at least one particular feature of a plurality of features of an electronic device accessible to the at least one invitee during a scheduled time for the meeting and to block use of a remaining selection of features of the plurality of features of the electronic device. The system comprises program instructions, stored on at least one of the one or more storage devices for execution by at least one of the one or more processors via at least one of the one or more memories, to scan the at least one electronic device associated with the at least one invitee to identify the plurality of features by requesting a configuration file from an operating system of the at least one electronic device and detecting the plurality of features of the electronic device from the configuration file, wherein the plurality of features comprise at least one hardware feature, at least one network feature, and at least one application feature. The system comprises program instructions, stored on at least one of the one or more storage devices for execution by at least one of the one or more processors via at least one of the one or more memories, to compare the plurality of features with a selection of features specified for control by the access rights. The system comprises program instructions, stored on at least one of the one or more storage devices for execution by at least one of the one or more processors via at least one of the one or more memories, to identify a first selection of features from among the selection of features matching the plurality of features, wherein the first selection of features are allowed for use during the meeting according to the access rights and a second selection of features from among the selection of features matching the plurality of features, wherein the second selection of features are disallowed from use during the meeting according to the access rights. The system comprises program instructions, stored on at least one of the one or more storage devices for execution by at least one of the one or more processors via at least one of the one or more memories, to display the first selection of features and the second selection of features in a meeting invitee interface. The system comprises program instructions, stored on at least one of the one or more storage devices for execution by at least one of the one or more processors via at least one of the one or more memories, to display, within the meeting invitee interface, a first selectable option for the at least one invitee to accept the access rights and meeting request. The system comprises program instructions, stored on at least one of the one or more storage devices for execution by at least one of the one or more processors via at least one of the one or more memories, to display, within the meeting invitee interface, a second selectable option for the at least one invitee to select at least one particular feature from among the second selection of features to request to add to the first selection of features. The system comprises program instructions, stored on at least one of the one or more storage devices for execution by at least one of the one or more processors via at least one of the one or more memories, responsive to the at least one invitee selecting the second selectable option and selecting the at least one particular feature, to send a request to a meeting manager for additional access rights with the at least one particular feature. The system comprises program instructions, stored on at least one of the one or more storage devices for execution by at least one of the one or more processors via at least one of the one or more memories, responsive to receiving a response from the meeting manager at the electronic device affirming the additional access rights, to remove the at least one particular feature from the second selection of features, add the at least one particular feature to the first selection of features, update the display of the second selection of features to remove the at least one particular feature, and update the display of the first selection of features to add the at least one particular feature to add the at least one particular feature. The system comprises program instructions, stored on at least one of the one or more storage devices for execution by at least one of the one or more processors via at least one of the one or more memories, in response to the at least one invitee selecting the first selectable option to accept the meeting request, to download a module specified by the meeting manager and required to be installed on the electronic device to enforce the access rights during the scheduled time for the meeting if the at least one invitee is detected as physically present at a particular location for the meeting, wherein the module is a controller. The system comprises program instructions, stored on at least one of the one or more storage devices for execution by at least one of the one or more processors via at least one of the one or more memories, to install the module on the electronic device. The system comprises program instructions, stored on at least one of the one or more storage devices for execution by at least one of the one or more processors via at least one of the one or more memories, to detect, by the module, from one or more input interfaces of the electronic device whether the at least one invitee is currently physically present in the particular location for the meeting during the scheduled time for the meeting, wherein the electronic device is accessible to the invitee during the meeting and the electronic device is not used by the at least one invitee to connectively access the meeting. The system comprises program instructions, stored on at least one of the one or more storage devices for execution by at least one of the one or more processors via at least one of the one or more memories, responsive to the module detecting the at least one invitee is currently physically present in the particular location for the meeting during the scheduled time for the meeting, to active the module to configure the electronic device to only provide access during the scheduled time for the meeting to the at least one particular feature of the electronic device allowed in the access rights specified in the accepted meeting request. The system comprises program instructions, stored on at least one of the one or more storage devices for execution by at least one of the one or more processors via at least one of the one or more memories, to control, by the module, the electronic device to only allow use of the at least one particular feature of the electronic device during the scheduled time for the meeting and blocking use of the at least one remaining features of the plurality of features of the electronic device not allowed in the access rights during the scheduled time for the meeting.

In another embodiment, a computer program product for providing controlled access to the use of an electronic device comprises a tangible computer-readable storage device having computer usable program code embodied therewith. The computer usable program code comprising computer usable program code configured to receive a meeting request for a meeting with at least one invitee, wherein the meeting request specifies access rights to use only at least one particular feature of a plurality of features of an electronic device accessible to the at least one invitee during a scheduled time for the meeting and to block use of a remaining selection of features of the plurality of features of the electronic device. The computer usable program code comprising computer usable program code configured to, responsive to receiving the meeting request, scan the at least one electronic device associated with the at least one invitee to identify the plurality of features by requesting a configuration file from an operating system of the at least one electronic device and detecting the plurality of features of the electronic device from the configuration file, wherein the plurality of features comprise at least one hardware feature, at least one network feature, and at least one application feature. The computer usable program code comprising computer usable program code configured to compare the plurality of features with a selection of features specified for control by the access rights. The computer usable program code comprising computer usable program code configured to identify a first selection of features from among the selection of features matching the plurality of features, wherein the first selection of features are allowed for use during the meeting according to the access rights and a second selection of features from among the selection of features matching the plurality of features, wherein the second selection of features are disallowed from use during the meeting according to the access rights. The computer usable program code comprising computer usable program code configured to display the first selection of features and the second selection of features in a meeting invitee interface. The computer usable program code comprising computer usable program code configured to display, within the meeting invitee interface, a first selectable option for the at least one invitee to accept the access rights and meeting request. The computer usable program code comprising computer usable program code configured to display, within the meeting invitee interface, a second selectable option for the at least one invitee to select at least one particular feature from among the second selection of features to request to add to the first selection of features. The computer usable program code comprising computer usable program code configured to, responsive to the at least one invitee selecting the second selectable option and selecting the at least one particular feature, send a request to a meeting manager for additional access rights with the at least one particular feature. The computer usable program code comprising computer usable program code configured to, responsive to receiving a response from the meeting manager at the electronic device affirming the additional access rights, remove the at least one particular feature from the second selection of features, add the at least one particular feature to the first selection of features, update the display of the second selection of features to remove the at least one particular feature, and update the display of the first selection of features to add the at least one particular feature to add the at least one particular feature. The computer usable program code comprising computer usable program code configured to, responsive to the at least one invitee selecting the first selectable option to accept the meeting request, download, by the electronic device, a module specified by the meeting manager and required to be installed on the electronic device to enforce the access rights during the scheduled time for the meeting if the at least one invitee is detected as physically present at a particular location for the meeting, wherein the module is a controller. The computer usable program code comprising computer usable program code configured to install, by the electronic device, the module on the electronic device. The computer usable program code comprising computer usable program code configured to detect, by the module, from one or more input interfaces of the electronic device, whether the at least one invitee is currently physically present in the particular location for the meeting during the scheduled time for the meeting, wherein the electronic device is accessible to the invitee during the meeting and the electronic device is not used by the at least one invitee to connectively access the meeting. The computer usable program code comprising computer usable program code configured to, responsive to the module detecting the at least one invitee is currently physically present in the particular location for the meeting during the scheduled time for the meeting, activate the module to configure the electronic device to only provide access during the scheduled time for the meeting to the at least one particular feature of the electronic device allowed in the access rights specified in the accepted meeting request. The computer usable program code comprising computer usable program code configured to control, by the module, the electronic device to only allow use of the at least one particular feature of the electronic device during the scheduled time for the meeting and blocking use of the at least one remaining features of the plurality of features of the electronic device not allowed in the access rights during the scheduled time for the meeting.

Additionally, in the embodiment, a meeting manager, during a meeting specified by the meeting request receives a request from the at least one invitee for use of a particular feature not allowed by the access rights from among the plurality of features and responsive to a meeting administrator authorizing use of the particular feature during the meeting, adjusts the access rights for the electronic device to allow use of the particular feature.

In addition, in the embodiment, a meeting controller scans the at least one electronic device associated with the at least one invitee to identify the plurality of features and compares the plurality of features with a selection of features specified for control by the access rights. The meeting controller identifies a first selection of features from among the plurality of features allowed for use during the meeting according to the access rights and a second selection of features from among the plurality of features disallowed from use during the meeting according to the access rights and displays the first selection of features and the second selection of features in a dynamic interface during the scheduled time for the meeting. The meeting controller offers a selectable option for the at least one invitee to select at least one particular feature from among the second selection of features to request to add to the first selection of features during the scheduled time for the meeting.

Further, in the embodiment, the meeting controller displays an interface on the electronic device including a selectable option for a user to request adjustment of the access rights during the scheduled meeting, independent of which of the plurality of features are allowed by the access rights.

Additionally, in the embodiment, features controllable by access rights include network use features, application features, and hardware element features.

Further, in the embodiment, automatic configuration of the electronic device to provide access to the particular feature allowed in the access rights requires downloading a module to the electronic device comprising the instructions for controlling the feature of the particular feature of the device during the meeting and installing the module on the electronic device. At the conclusion of the scheduled meeting time or when the invitee no longer participates in the meeting, the meeting controller at the electronic device automatically disables the module from controlling use of the features of the electronic device.

BRIEF DESCRIPTION OF THE SEVERAL VIEWS OF THE DRAWINGS

The novel features believed characteristic of one or more embodiments of the invention are set forth in the appended claims. The one or more embodiments of the invention itself however, will best be understood by reference to the following detailed description of an illustrative embodiment when read in conjunction with the accompanying drawings, wherein:

FIG. 1 is a block diagram depicting one embodiment of a meeting controller for providing controlled access to electronic devices by invitees to a meeting during the meeting;

FIG. 2 is a block diagram illustrating one embodiment of a meeting manager for managing distribution of access rights to control use of electronic devices by invitees during a meeting;

FIG. 3 is a block diagram depicting one embodiment of a network environment for managing access rights of electronic devices during a meeting;

FIG. 8 is a high level logic flowchart depicting a process and program for managing a meeting requester's specification and scheduling of a meeting request;

FIG. 9 is a high level logic flowchart illustrating a process and program for a meeting manager for managing meeting requests with access rights for controlling use of electronic device during meetings;

DETAILED DESCRIPTION

Figure 4:
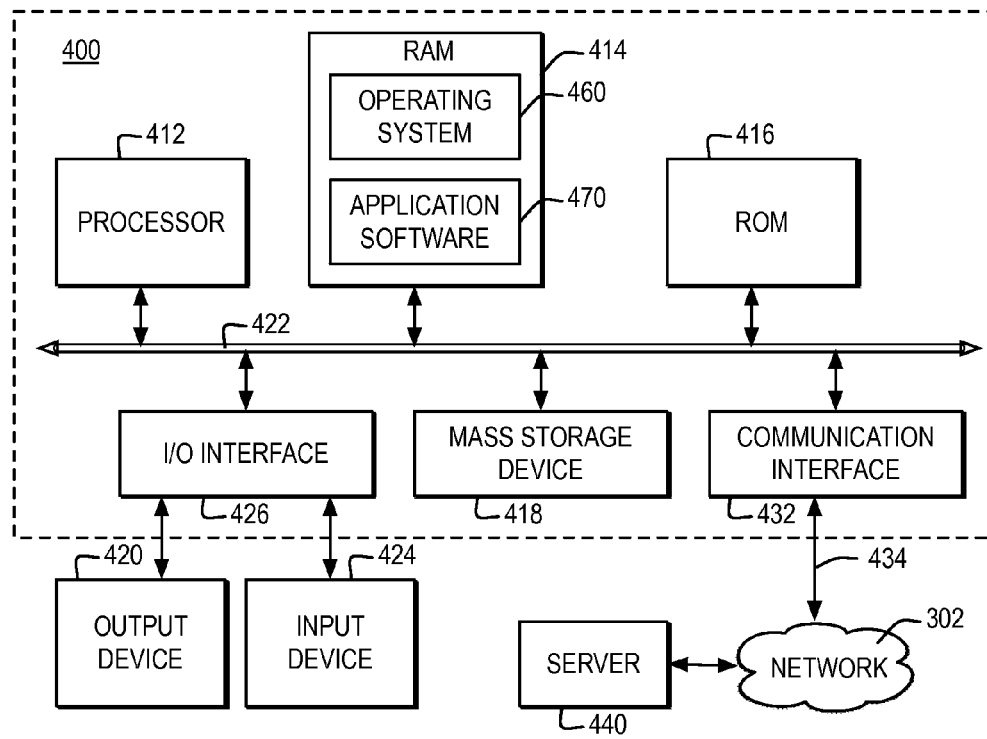
FIG. 4 is a block diagram illustrates an example of a computer system in which the present invention may be implemented.

Referring now to FIG. 1, a block diagram depicts one embodiment of a meeting controller for providing controlled access to electronic devices by invitees to a meeting during the meeting.

In the example, a meeting controller 100 includes a meeting scheduling controller 102, a meeting specification database 104, an electronic device use controller 106, an accepted access rights database 108, and a feature scanner 110. It will be understood that meeting controller 100 may include additional or alternate components to the controllers and databases depicted and that the components of meeting controller 100 may be distributed within a single system or across multiple systems.

In one example, meeting scheduling controller 102 provides an interface and functionality for a requester to specify and send a meeting request, where the meeting request includes at least one detail about a requested meeting and access rights for controlling use of electronic devices during the meeting. Meeting scheduling controller 102 may send the meeting request via one or more types of connections to one or more systems.

The details about a meeting may include, but are not limited to, a meeting time, multiple proposed meeting times, one or more meeting locations, one or more network addresses specified for the meeting, one or more communication channels specified for the meeting, a telephone line reserved for the meeting, one or more meeting subjects, a name or identifier for one or more meeting invitees, and other information specifying the parameters of a meeting. A requester may request a meeting occur at one or more physical locations, via one or more network locations, via one or more communication channels, or a combination of locations and channels.

The access rights for placing limitations on the use of electronic devices during a meeting may include controls for restricting use of a particular feature of an electronic device, restricting use of a type of feature on an electronic device, only allowing access to one or more features of an electronic device, and other specified controls on the access rights to use electronic devices during a meeting. A feature of an electronic device may include, but is not limited to, a hardware device, an application, an operating system function, a network channel, and any other component, executable or function of an electronic device. A requester may further specify the limitations specified by access rights according to an identifier for an invitee, by type of electronic device, by meeting location, and by other criteria. For a particular invitee, a requester may specify the access rights controlling use of a particular electronic device or all electronic devices accessible to the invitee.

Meeting scheduling controller 102 may record meeting requests and scheduled meetings in meeting specification database 104. In one example, meeting scheduling controller 102 may control an interface for displaying meeting requests and scheduled meetings stored in meeting specification database 104. In one example, meeting schedule controller 102 may plug-in to a calendar interface controller (not depicted) or other application for displaying events.

In addition, in one example, meeting scheduling controller 102 provides an interface and functionality for an invitee to receive a meeting request that includes at least one detail about a meeting and access rights for controlling use of electronic devices during the meeting. Meeting scheduling controller 102 may receive the meeting request via one or more types of connections to one or more systems.

When meeting scheduling controller 102 receives a meeting request, meeting scheduling controller 102 may trigger an interface for presenting the request to an invitee or may trigger another application, such as an application which maintains and displays a calendar, to present the request to an invitee. In one example, meeting scheduling controller 102 presents the meeting request to an invitee specifying the access rights for controlling use of electronic devices during the meeting, where the invitee is required to accept the access rights, download electronic device use controller 106, and install electronic device use controller 106 to accept the meeting request. In another example, meeting scheduling controller 102 presents the meeting request to an invitee specifying the access rights for controlling use of electronic devices during the meeting with an option for the invitee to request to negotiate with the meeting requester to adjust the access rights. In particular, meeting schedule controller 102 at a requester system may receive requests for negotiation of access rights and engage in communications for negotiating the access rights with the invitee.

When an invitee accepts a meeting request, meeting scheduling controller 102 may store the accepted meeting request in meeting specification database 104 and also store a record of the invitee acceptance of the access rights for a meeting in accepted access rights database 108. Electronic device use controller 106 is then set to control use of one or more electronic devices during meeting times according to the applicable access rights in accepted access rights database 108.

In one example, when an invitee accepts the access rights specified in a meeting request, the meeting request includes the rules for the access rights. Meeting scheduling controller 102 stores the rules for the access rights in accepted access rights database 108 and during the meeting, electronic device use controller 106 controls use of at least one electronic device by an invitee according to the rules for the access rights accessed from accepted access rights database 108.

In another example, when an invitee accepts the access rights specified in a meeting request, meeting scheduling controller 102 sends a record of the acceptance to a computer system implementing a meeting manager, as will be further described with reference to FIG. 2, and the acceptance also authorizes the meeting manager to download and install electronic device use controller 106 with specific access rights limitations, to meeting controller 100.

In yet another example, when an invitee accepts the access rights specified in a meeting request, a record of the acceptance and the network location of a server implementing a meeting manager for specifying the access rights for an electronic device during the meeting is placed in accepted access rights database 108. During the meeting, electronic device use controller 106 detects the network location of the server, sends a request to the server for access rights for the electronic device for the meeting time, and periodically queries the server for updated access rights for the electronic device during the meeting.

Electronic device use controller 106, in one example, is activated to control use of an electronic device when the current time is within the parameters of the scheduled meeting time for the meeting. In another example, electronic device use controller 106 is activated by network communication from another system. In addition, in other examples, electronic device use controller 106 may include additional or alternate rules for activating controlled use of an electronic device during a meeting or may receive additional or alternate types of signals for triggered controlled use of an electronic device during a meeting.

Electronic device use controller 106, at the conclusion of a scheduled meeting, may automatically remove itself from meeting controller 100 or may automatically disable control over an electronic device. Prior to automated removal or disabling, electronic device use controller 106 may query a meeting scheduler, such as by querying meeting manager 200 described in FIG. 2, to confirm that a meeting is concluding at a scheduled time. Moreover, prior to the conclusion of a meeting, meeting scheduling controller 102 may prompt the meeting scheduler or a meeting invitee to indicate whether the duration of a meeting has been shortened or needs to be extended.

Further, electronic use controller 106, may be activated to control use of an electronic device during a meeting only while an invitee is in attendance. To detect whether an invitee is attending a meeting, in one example, electronic device use controller 106 may control an interface or selectable option for a user to indicate who is actually attending a scheduled meeting, where upon selection of the attending invitees, electronic device use controller 106 controls use of an electronic device by the participating invitees. In another example, electronic device use controller 106 may control output of a selectable option for an invitee to indicate whether the invitee is actually attending a scheduled meeting, where upon selection by the invitee of the option indicating attendance, electronic device use controller 106 controls use of an electronic device by the participating invitee. Additionally, electronic device use controller 106 may monitor other types of inputs to detect an invitee participation in a meeting. For example, electronic device use controller 106 may detect user participation in a meeting through detecting a user's actual physical presence in a particular location through a captured video image identifying the user in the location, a scan of the user's identification badge in a particular location, a user's voice captured and identified at a particular location. In another example, electronic device use controller 106 may infer user participation in a meeting through user inputs to an electronic device, such as keypad inputs, mouse inputs, or inputs through other input interfaces or through a lack of inputs to an electronic device or through a user setting an electronic device to a mode indicative of a meeting, such as by a user silencing a speaker on an electronic device.

If an invitee leaves a meeting early or a meeting is canceled, electronic device use controller 108 may also provide a selectable option for the invitee, scheduler, or other user to select to deactivate electronic device use controller 106 prior to the end of the scheduled meeting time. Further, during a meeting, electronic use controller 106 may trigger an interface through which an invitee requests adjustment of access right during the meeting, where electronic use controller 106 controls distribution of the request to adjust access rights to a meeting requester or other authority. It is important to note that even when the access rights for a meeting require electronic device use controller 106 disable use of all programs on an electronic device, electronic device use controller 106 may still provide an interface or other option for a user to select inputs such as an indication of actual meeting attendance and requests to adjust the access rights allowed during an attended meeting.

Meeting controller 100 may include a feature scanner 110. Feature scanner 110 may scan one or more electronic devices associated with an invitee to detect the features available from each applicable electronic device. In one example, meeting scheduling controller 102 may compare the actual features of an electronic device with the features restricted in the access rights for a meeting request and dynamically adjust the access rights presented to an invitee to only list the actual features available to the invitee which a meeting request restricts. In another example, meeting schedule controller 102 may list all the features of a detected electronic device by feature scanner 110 and designate whether each feature is allowed or disallowed by the access rights specified in a meeting request. Feature scanner 110 may scan one or more electronic devices in different ways, as will be understood by someone with skill in the art, based on the device. In one example, feature scanner 110 may request a configuration file from an operating system of an electronic device and detect features of the electronic device from the configuration file. In another example, feature scanner 110 may detect a model number of an electronic device and access a list of standard features for the model number from a database.

With reference now to FIG. 2, a block diagram depicts one embodiment of a meeting manager for managing distribution of access rights to control use of electronic devices by invitees during a meeting.

In the example, a meeting manager 200 includes a scheduling management controller 202, a meeting management database 204, an electronic device use authorization responder 206, an electronic device access rights database 208, and an electronic device use controller database 210. It will be understood that meeting manager 200 may include additional or alternate components to the controllers and databases depicted and that the components of meeting manager 200 may be distributed within a single system or across multiple systems.

In the example, a scheduling management controller 202 manages receipt, distribution, confirmation, scheduling, organization, and other transmissions of meeting requests and scheduled meetings, which may be recorded and stored within meeting management database 204. Meeting management database 204 may include the current schedules, scheduling availability, scheduling preferences, scheduling restrictions, and other scheduling information for one or more users, such that scheduling management controller 202 is able to identify and suggest times available for a meeting for multiple users and scheduling management controller 202 is able to coordinate the reservation, scheduling, and calendaring of meetings between multiple users.

In addition, in the example, an electronic device use authorization responder 206 manages the scheduling and application of electronic device access rights in association with meetings and maintains requested and accepted meeting access rights in electronic device access rights database 208. Electronic device use authorization responder 206 may detect meeting requests that include specified access rights and may direct scheduling management controller 202 to present the meeting request to the invitee with acceptance of the meeting request, contingent upon the invitee first accepting the specified access rights, downloading an electronic device use controller, and installing the electronic device use controller. Electronic device use authorization responder 206 may detect an invitee's acceptance of a meeting request with specified access rights and may specify and transmit or download a controller or module from electronic device use controller database 210 to the invitee's electronic devices, such as electronic device use controller 106, that when installed and executed on the invitee's electronic device, will enforce the access rights for a meeting specified in electronic device use controller database 208. In addition, electronic device use authorization responder 206 may detect an invitee's acceptance of a meeting request with specified access rights and may send specified rules for the access rights to electronic device use controller 106 to direct an already installed electronic device use controller 106 to enforce the access rights.

In managing a meeting request acceptance by an invitee, electronic device use authorization responder 206 may receive a request from an invitee to adjust the access rights. In addition, during a meeting, electronic device use authorization responder 206 may receive a request from an invitee to adjust the access rights. Electronic device use authorization responder 206 distributes the request to adjust the access rights to the meeting requester or other authority. Electronic device use authorization responder 206 either receives a response from a meeting requester or other authority authorizing or declining the adjustment request, or after a timeout period automatically declines the adjustment request, and sends the response to the invitee.

A meeting requester may specify dynamic access rights in a meeting request or during a meeting. For example, dynamic access rights may include limitations which are contingent upon events that may occur prior to or during the meeting. In another example, dynamic access rights may be access rights that a meeting participant or meeting administrator may selectively adjust during the meeting. In one example, to enforce dynamic access rights, electronic device use authorization responder 206 may detect an invitee's acceptance of a meeting request with dynamic access rights, store the acceptance and specified dynamic access rights in electronic device access rights database 208, detect requests from electronic devices during a meeting for the current state of the dynamic access rights, determine the current state of the dynamic access rights, and send transmissions to the electronic devices with current state of the dynamic access rights from electronic device access rights database 208. To adjust the dynamic access rights for a meeting, during the meeting, in one example, scheduling management controller 202 may provide an interface through which a user may selectively authorize or deauthorize specific access rights for specific invitees, during the meeting, and scheduling management controller 202 updates electronic device access rights database 208 with selective adjustments.

With reference now to FIG. 3, a block diagram depicts one embodiment of a network environment for managing access rights of electronic devices during a meeting. In the example, in a network environment 300, a network 302 communicatively connects multiple systems, such as electronic device 310, electronic device 320, client system 330, network service provider 340, and server system 350. Network 302 may include, but is not limited to, packet-switching networks, such as the Internet or an intranet, and telephony networks. In addition, network 302 may include routers, switches, gateways, and other hardware to enable a communication channel between electronic device 310, electronic device 320, client system 330, network service provider 340, and server system 350. Further, while in the example electronic device 310, electronic device 320, client system 330, network service provider 340, and server system 350 are depicted as communicating via network 302, in an alternate embodiment, one or more of the systems may be incorporated within network 302.

In the example, electronic device 310 includes a meeting controller 312, electronic device 320 includes a meeting controller 322, client system 330 includes a meeting controller 332, and network service provider 340 includes a meeting controller 342, where meeting controller 312, meeting controller 322, meeting controller 332, and meeting controller 342 include one or more of the components of meeting controller 100 of FIG. 1. In addition, server system 350 includes a meeting manager 352 and client system 330 includes a meeting manager 334, where meeting manager 352 and meeting manager 334 include one or more of the components of meeting controller 200 of FIG. 2.

In one example, meeting manager 352 sends a meeting request to electronic device 310 requiring an invitee to the meeting to accept access rights controlling the use of electronic device 310 in order to accept the meeting request. When the invitee accepts the meeting request, meeting manager 352 may control use of electronic device 310 according to the specified access rights in one or more ways. For example, meeting manager 352 may send the specified access rights to meeting controller 312 for meeting controller 312 to locally determine and control use of electronic device 310. In another example, meeting manager 352 may direct meeting controller 312 to restrict all functions of electronic device 310 during a meeting except for network access to meeting manager 352 to receive current access rights. In yet another example, meeting manager 352 may specify electronic device use controller 106 for meeting controller 312 for controlling use of electronic device 310 during the meeting and require meeting controller 312 download and install specified electronic device use controller 106.

In addition, when meeting manager 352 sends a meeting request to electronic device 310 requiring an invitee to the meeting to accept access rights controlling use of electronic device 310, meeting manager 352 may permit the invitee to request to negotiate for additional or alternate access rights. In one example, via meeting controller 312, an invitee requests additional access rights and meeting manager 352 forwards the request to the meeting requester via meeting controller 332. If the meeting requester authorizes the additional access rights, meeting controller 332 directs meeting manager 352 to update the access rights for the meeting request for the particular invitee and meeting manager 352 presents the meeting request with updated access rights to the invitee for acceptance via meeting controller 312.

Further, during the meeting, meeting manager 352 may allow an invitee to negotiate for additional or alternate access rights. In one example, via meeting controller 312, an invitee requests additional access rights and meeting manager 352 forwards the request to the meeting requester via meeting controller 332. If the meeting requester authorizes the additional access rights, meeting controller 332 directs meeting manager 352 to update the access rights for the meeting request for the particular invitee and meeting manager 352 updates the access rights applicable during the meeting via meeting controller 312.

In addition, during the meeting, meeting manager 352 may detect an invitee or meeting requester registration of the actual attendance at a meeting. In one example, via meeting controller 312, an invitee indicates participation in a meeting, through selecting a particular input indicating attendance or through meeting controller 312 detecting other information that indicates an invitee's participation in a meeting. In another example, via meeting controller 332, a meeting requester may specify which invitees are in attendance during a meeting.

Moreover, during the meeting, meeting manager 352 may allow an invitee or meeting requester to adjust the duration of a meeting, where by adjusting the duration of the meeting, meeting manager 352 provides updates to applicable meeting controllers to update the time during which access rights for the meeting apply.

In the example, client system 330 provides an example of a system providing both meeting controller 332 and meeting manager 334, where meeting controller 332 may provide an interface for a requester to specify meeting requests with access rights and meeting manager 334 may manage distribution and acceptance of meeting requests and enforcement of access rights. In addition, meeting controller 332 may provide an interface for an invitee to accept a meeting request with access rights, where the access rights are for use of a separate electronic device, such as electronic device 310 or electronic device 320, and meeting manager 334 manages enforcement of access rights on the applicable electronic devices.

In addition, in the example, a network service provider 340 with a meeting controller 342 provides an example where meeting controller 342 may manage enforcement of access rights on electronic device 344, by restricting the service provided by network service provider 340 to electronic device 344. In particular, network service provider 340 may provide a network service to electronic device 344 to access network 302, where network service provider 340 also implements meeting controller 342 to enforce access rights during meeting accepted by invitees, where the access rights include controlled use of the network service provided by network service provider 340. In one example, a meeting request may further restrict access rights to an area in which network service provider 340 provides access to any electronic devices, such as electronic device 344, such that when an invitee accepts the access rights specified in a meeting request, the invitee accepts meeting controller 342 controlling the access to network service by any electronic device the invitee brings into the meeting area.

To detect an electronic device brought into a meeting area, in one example, network service provider 340 may detect electronic devices brought into a meeting area by a local wireless controller of network service provider 340 detecting a network connection request from electronic devices to the local wireless controller, for a wireless connection. In another example, network service provider 340 may detect electronic devices brought into a meeting area through a device within a meeting area that scans an area for thermal signatures representing electronic devices. It will be understood that network service provider 340 may receive signals from additional and alternate types of controllers enabled to detect a presence of an electronic device during a meeting or within a meeting area.

With reference now to FIG. 4, a block diagram illustrates an example of a computer system in which the present invention may be implemented. The present invention may be executed in a variety of systems and combinations of systems, made up of functional components, such as the functional components described with reference to computer system 400 and may be communicatively connected to a network, such as network 302.

Computer system 400 includes a bus 422 or other communication device for communicating information within computer system 400, and at least one processing device such as processor 412, coupled to bus 422 for processing information. Bus 422 preferably includes low-latency and higher latency paths that are connected by bridges and adapters and controlled within computer system 400 by multiple bus controllers. When implemented as a server, computer system 400 may include multiple processors designed to improve network servicing power. Where multiple processors share bus 422, additional controllers (not depicted) for managing bus access and locks may be implemented.

Processor 412 may be a general-purpose processor such as IBM's PowerPC (PowerPC is a registered trademark of International Business Machines Corporation) processor that, during normal operation, processes data under the control of an operating system 460, application software 470, middleware (not depicted), and other code accessible from a dynamic storage device such as random access memory (RAM) 414, a static storage device such as Read Only Memory (ROM) 416, a data storage device, such as mass storage device 418, or other data storage medium. In one embodiment, the operations performed by processor 412 may control management of content displayed on portable, content adjustable identification devices as depicted in the operations of flowchart of FIGS. 8-11 and other operations described herein. Operations performed by processor 412 may be requested by operating system 460, application software 470, middleware or other code or the steps of the present invention might be performed by specific hardware components that contain hardwired logic for performing the steps, or by any combination of programmed computer components and custom hardware components.

As will be appreciate by one skilled in the art, the present invention may be embodied as a system, method or computer program product. Accordingly, the present invention may take the form of an entirely hardware embodiment, an entirely software embodiment (including firmware, resident software, micro-code, etc) or an embodiment containing software and hardware aspects that may all generally be referred to herein as "circuit," "module," or "system." Furthermore, the present invention may take the form of a computer program product embodied on any tangible medium of expression having computer-usable program code embodied in the medium.

Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, such as mass storage device 418, a random access memory (RAM), such as RAM 414, a read-only memory (ROM), an erasable programmable read-onlymemory (EPROM or Flash memory), an optical fiber, a portable compact disc read-only memory (CDROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wireline, optical fiber cable, RF, etc.

Computer program code for carrying out operations of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, such as computer system 400, partly on the user's computer, as a stand-alone software package, partly on the user's computer and partly on a remote computer or entirely on the remote computer or server, such as a server 440. In the latter scenario, the remote computer may be connected to the user's computer through any type of network, such as network 302, through a communication interface 432 over a network link 434, that may be connected, for example, to network 302 including a local area network (LAN) or a wide area network (WAN), or the connection may be made to an external computer (for example, through the Internet using an Internet Service Provider). Although not depicted, communication interface 432 may include software, such as device drivers, hardware, such as adapters, and other controllers that enable communication. When implemented as a server, computer system 400 may include multiple communication interfaces accessible via multiple peripheral component interconnect (PCI) bus bridges connected to an input/output controller, for example. In this manner, computer system 400 allows connections to multiple clients via multiple separate ports and each port may also support multiple connections to multiple clients.

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer, such as computer system 400, or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer, such as computer system 400, or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

Network link 434 and network 302 both use electrical, electromagnetic, or optical signals that carry digital data streams. The signals through the various networks and the signals on network link 434 and through communication interface 432, which carry the digital data to and from computer system 300, may be forms of carrier waves transporting the information.

In addition, computer system 400 may include multiple peripheral components that facilitate input and output. These peripheral components are connected to multiple controllers, adapters, and expansion slots, such as input/output (I/O) interface 426, coupled to one of the multiple levels of bus 422. For example, input device 424 may include, for example, a microphone, a video capture device, a body scanning system, a keyboard, a mouse, or other input peripheral device, communicatively enabled on bus 422 via I/O interface 426 controlling inputs. In addition, for example, a display device 420 communicatively enabled on bus 422 via I/O interface 426 for controlling outputs may include, for example, one or more graphical display devices, audio speakers, and tactile detectable output interfaces, but may also include other output interfaces. In alternate embodiments of the present invention, additional or alternate input and output peripheral components may be added.

Those of ordinary skill in the art will appreciate that the hardware depicted in FIG. 4 may vary. Furthermore, those of ordinary skill in the art will appreciate that the depicted example is not meant to imply architectural limitations with respect to the present invention.

Figure 5:
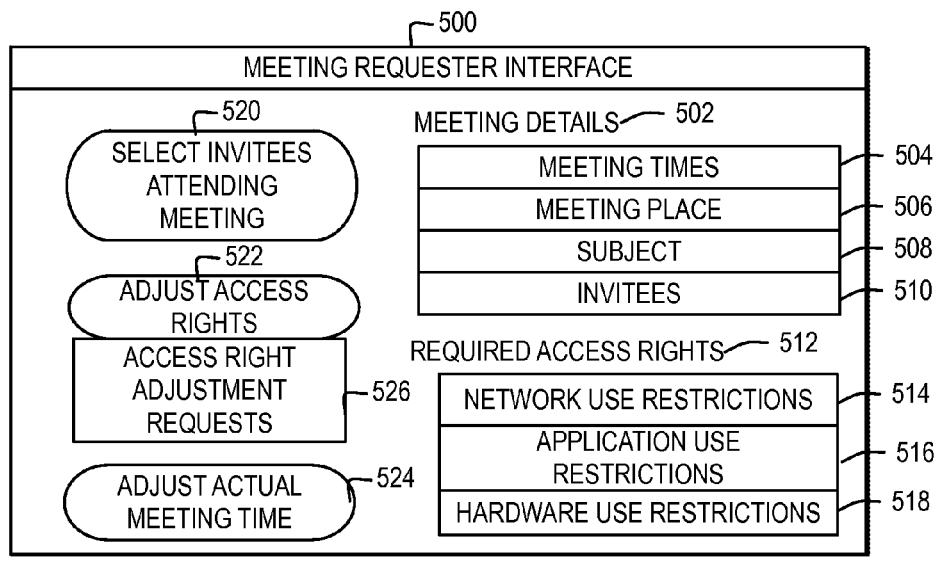
FIG. 5 is a block diagram illustrating one embodiment of selectable options within a meeting requester interface for a requester to specify a meeting request with access rights for controlling use of invitee electronic devices during the meeting

With reference now to FIG. 5, a block diagram illustrates one embodiment of selectable options within a meeting requester interface for a requester to specify a meeting request with access rights for controlling use of invitee electronic devices during the meeting. In the example, a meeting requester interface 500 includes selectable options for meeting details 502 and for required access rights 512.

As illustrated in the example, selectable options for meeting details 502 may include meeting times 504, meeting place 506, subject 508, and invitees 510. Meeting times 504 may include a specific meeting time, suggested meeting times, optional meeting times, and other time boundaries. Meeting place 506 may include specification of at least one of one or more physical locations and one or more network or communication channels. Subject 508 may include the subject or focus of the meeting. Invitees 510 may include specific users, a group of users, a type of user, and other user limitations. It will be understood that additional or alternate types of selectable options may be provided to a user to define meeting details 502.

In addition, as illustrated in the example, selectable options for required access rights 512 may include multiple types of restriction options. In the example, a selectable option of network user restrictions 514 may include restrictions on use of network applications, a network channel, a type of network service, security requirements for network channel use, and other limitations on network use. In addition, in the example, a selectable option of application use restrictions 516 may include restrictions on use of one or more specific applications or types of applications. In addition, in the example, a selectable option of hardware use restrictions 518 may include restrictions on use of one or more hardware features, including, but not limited to, a keyboard, mouse, display interface, printer, network adapter, power source, battery, speaker, microphone, external memory, or touchpad.

In specifying required access rights 512, a requester may further specify different sets of access rights and assign each set of access rights to one or more invitees, to one or more time periods further delineated within meeting times 504, and to one or more places further delineated within meeting place 506. In addition, in specifying required access rights 512, a requester may specify dynamic access rights which are dependent upon one or more events or which the requester may adjust during the meeting.

In addition, as illustrated in the example, meeting requester interface 500 may include additional selectable options for adjusting meeting details and access rights during a meeting. In particular, in the example, meeting requester interface includes selectable option 520 for identifying invitees attending a meeting, selectable option 522 for adjusting access rights during a meeting, and selectable option 524 for adjusting the actual meeting time.

In the example, a requester may select selectable option 520 to select and identify which invitees are in attendance at a meeting. As invitees enter and exit a meeting, the requester may select selectable option 520 to provide updates. In addition, meeting requester interface 500 may include a list of the invitees detect within a meeting area or invitees which have registered attendance at the meeting, where the requester may select selectable option 520 to verify or change the actual invitee attendance record.

In addition, as illustrated in the example, a requester may select selectable option 522 to select to adjust access rights or approved requests for adjusted access rights. In one example, meeting requester interface 500 may include a list of requested access rights adjustments as illustrated at reference numeral 526, where a requester selects through selectable option 522 whether to authorize each request.

Further, as illustrated in the example, a requester may select selectable option 524 to select to adjust the actual meeting time for a meeting, such as to adjust the actual start or end time of a meeting. Since invitees to the meeting agree to restricted use of electronic devices during a meeting time, by selecting selectable option 524 to adjust the meeting time, the requester triggers a meeting controller to request adjustment to the meeting time applied to electronic devices by electronic device use controllers active on invitee electronic devices.

Figure 6:
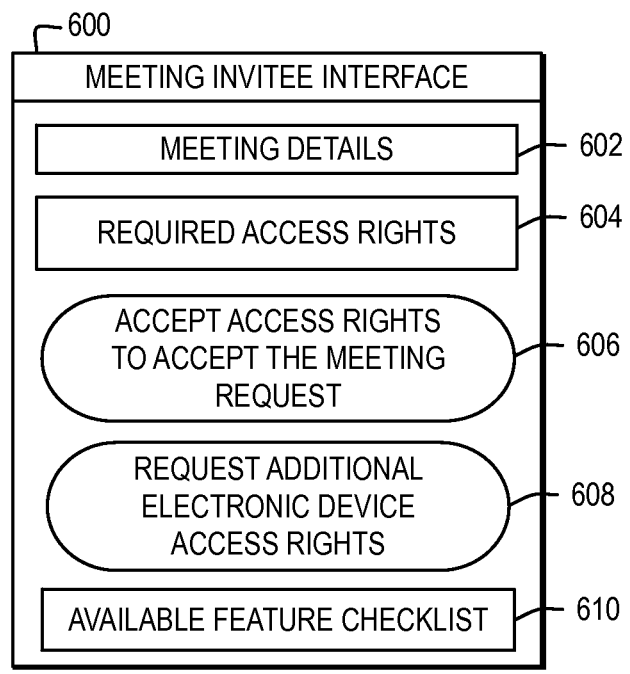
FIG. 6 is a block diagram depicting one embodiment of selectable options within a meeting invitee interface for an invitee receiving a meeting request with access rights required for an invitee to accept the meeting.

With reference now to FIG. 6, a block diagram illustrates one embodiment of selectable options within a meeting invitee interface for an invitee receiving a meeting request with access rights required for an invitee to accept the meeting. In the example, a meeting invitee interface 600 includes meeting details 602, required access rights 604, a selectable option 606 for an invitee to accept the access rights and meeting request, a selectable option 608 for an invitee to request additional or alternate electronic device access rights, and an available feature checklist 610 for displaying the available features of an electronic device.

In the example, an invitee may select selectable option 606 to accept the access rights and the meeting request. Alternatively, the invitee may select selectable option 608 to request additional electronic device access rights. If the user elects to request additional electronic device access rights, in one example, available feature checklist 610 may become a selectable list, in which a user may select additional features to add to the access rights. As requests are made for additional access rights and the requester accepts or denies the requests for additional access rights, meeting invitee interface 600 may also be updated to include a log of the requests and available feature checklist 610 may be updated to graphically distinguish the allowed and disallowed features within the access rights for the meeting.

In addition, in the example, an invitee may access meeting invitee interface 600 during a meeting and select selectable option 608. In particular, during a meeting an invitee may request additional access rights as needed to further participate in the meeting.

Figure 7:
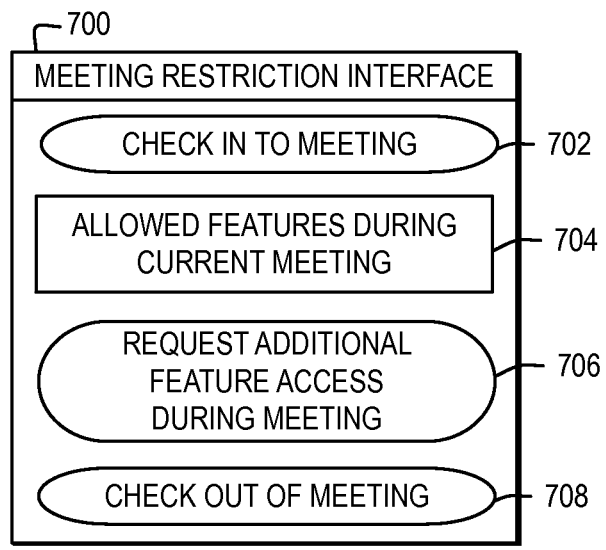
FIG. 7 is a block diagram illustrating one embodiment of a selectable option within a meeting invitee interface for an invitee receiving a meeting request with specified lists of allowed and disallowed features of a particular electronic device according to the access rights specified for the meeting.

Referring now to FIG. 7, a block diagram illustrates one embodiment of a meeting restriction interface displayed to an invitee during a meeting. In the example, a meeting restriction interface 700 includes a selectable option 702 to check in to the meeting, a list of allowed features during the current meeting as illustrated at reference numeral 704, a selectable option 706 to request additional feature access during the meeting, and a selectable option 708 to check out of the meeting.

In the example, an electronic device use controller, such as electronic device use controller 106, may trigger display of meeting restriction interface 700 on an electronic device controlled by the electronic device use controller during a meeting. In one example, electronic device use controller 106 may apply access rights that disallow use of any applications on an electronic device or any input interfaces of an electronic device, except for allowing the user to interact with meeting restriction interface 700. In another example, electronic device use controller 106 may integrate one or more of selectable options 702, 706 and 708 and the list of allowed features illustrated at reference numeral 704 into an application included in the allowed features by the access rights applied to an electronic device, such as within meeting scheduling controller 102.

In one example, electronic device use controller 106 triggers meeting restriction interface 700 within a display area upon the start of a scheduled meeting time or within a set range of time prior to a scheduled meeting time. In another example, an invitee may request to open meeting restriction interface 700 within a display area.

An invitee may select selectable option 702 to select to check into a meeting or indicate presence at a meeting and may select selectable option 708 to select to check out of a meeting or indicate the invitee is no longer present at the meeting. Electronic device use controller 106 may transmit the check in or check out indicator to a meeting manager to update the record for the scheduled meeting. In addition, when a user checks into a meeting through a selection of selectable option 702, check in may automatically activate controlled use of features of the electronic device by electronic device use controller 106 and check out may automatically deactivate controlled use of features of the electronic device by electronic device use controller 106.

An invitee may select selectable option 706 to request additional or alternate feature access during the meeting. In one example, in response to a user selection of selectable option 706, electronic device use controller 106 may trigger an additional interface displaying the features of an electronic device with options for an invitee to select additional or alternate features to access during a meeting from the list of features. As the features allowed during a meeting change during a meeting, electronic device use controller 106 may update the allowed features during the current meeting illustrated at reference numeral 704.

With reference now to FIG. 8, a high level logic flowchart depicts a process and program for managing a meeting requester's specification and scheduling of a meeting request. In the example, the process starts at block 800 and thereafter proceeds to block 802. Block 802 illustrates specifying a meeting request with access rights for controlling use of electronic devices of invitees during the meeting. Next, block 804 depicts submitting the meeting request to a meeting manager. Thereafter, block 806 illustrates a determination whether a request for adjusted access rights is received prior to or during the meeting. If a request for adjusted access rights is not received, then the process ends. If a request for adjusted access rights is received, then the process passes to block 808. Block 808 illustrates presenting the request to the meeting scheduler for authorization. Next, block 810 depicts sending the authorization response to the meeting manager, and the process returns to block 806.

Referring now to FIG. 9, a high level logic flowchart illustrates a process and program for a meeting manager for managing meeting requests with access rights for controlling use of electronic device during meetings. In the example, the process starts at block 900 and thereafter proceeds to block 902. Block 902 illustrates a determination whether a meeting request is received. If the meeting manager receives a meeting request, then the process passes to block 904. Block 904 depicts distributing meeting requests to each invitee with a requirement for acceptance of the access rights to accept the meeting request. Next, block 906 illustrates a determination when an invitee responds, what type of response is received. In the example, the responses of "accept" for accept the access rights and "adjusted" for requesting adjusted access rights are illustrated, however additional responses, such as an invitee declining a request or an invitee requesting adjustments to the meeting time, place, invitees, subject, or other meeting details, may also be received and processed.

At block 906, if an invitee responds with an acceptance, then the process passes to block 908. Block 908 depicts updating the electronic device access rights database with the acceptance. Next, block 910 illustrates triggering control of the applicable electronic devices according to the accepted access rights, and the process ends.

At block 906, if an invitee responds with an adjusted access rights request, then the process passes to block 912. Block 912 illustrates sending a request for adjusted access rights to the meeting requester. Next, block 914 depicts a determination whether a response is received to the request for adjusted access rights. When a response is received from the meeting requester, or after a timeout period, then the process passes to block 916. Block 916 illustrates distributing the response to the requesting invitee and the process returns to block 906.

Figure 10:
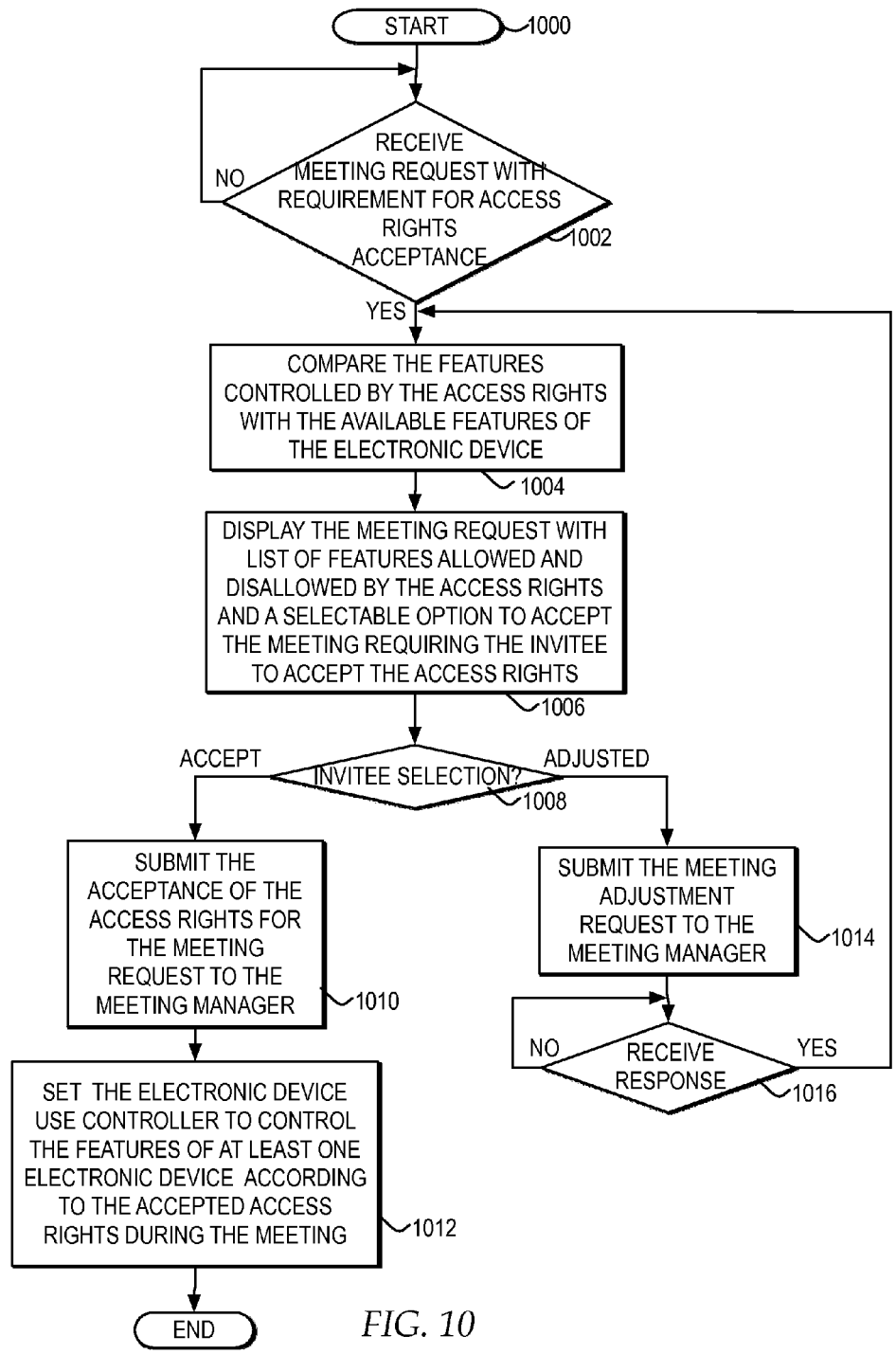
FIG. 10 is a high level logic flowchart depicting a process and program for managing invitee acceptance of meeting requests with access rights for controlling use of an electronic device by the invitee during the meeting.

With reference now to FIG. 10, a high level logic flowchart depicts a process and program for managing invitee acceptance of meeting requests with access rights for controlling use of an electronic device by the invitee during the meeting. In the example, the process starts at block 1000 and thereafter proceeds to block 1002. Block 1002 illustrates a determination whether a meeting controller for an invitee receives a meeting request with a requirement for access rights acceptance. If the meeting controller for an invitee receives a meeting request with a requirement for access rights acceptance, then the process passes to block 1004. Block 1004 depicts comparing the features controlled by the access rights with the available features of the electronic device. Next, block 1006 illustrates displaying the meeting request with the list of features allowed and disallowed by the access rights and a selectable option to accept the meeting requiring the invitee to accept the access rights. Thereafter, block 1008 depicts a determination when an invitee makes a selection in response to the meeting request, what type of selection is received. In the example, the responses of "accept" for accept the access rights and "adjusted" for requesting adjusted access rights are illustrated, however additional responses, such as an invitee declining a request or an invitee requesting adjustments to the meeting time, place, invitees, subject, or other meeting details, may also be received and processed.

At block 1006, if an invitee responds by accepting the access rights for the meeting request, then the process passes to block 1010. Block 1010 depicts submitting the acceptance of the access rights for the meeting request to the meeting manager. Next, block 1012 illustrates setting the electronic device use controller to control the features of at least one electronic device according to the accepted access rights during the meeting, and the process ends. In one example, setting the electronic device use controller to control the features of at least one electronic device requires accepting a downloaded electronic device use controller and installing the electronic device use controller.

At block 1006, if an invitee responds by requesting to adjust the access rights for the meeting request, then the process passes to block 1014. Block 1014 illustrates submitting the meeting adjustment request to the meeting manager. Next, block 1016 depicts a determination whether a response is received from the meeting manager. When a response is received from the meeting manager, the process returns to block 1004.

Figure 11:
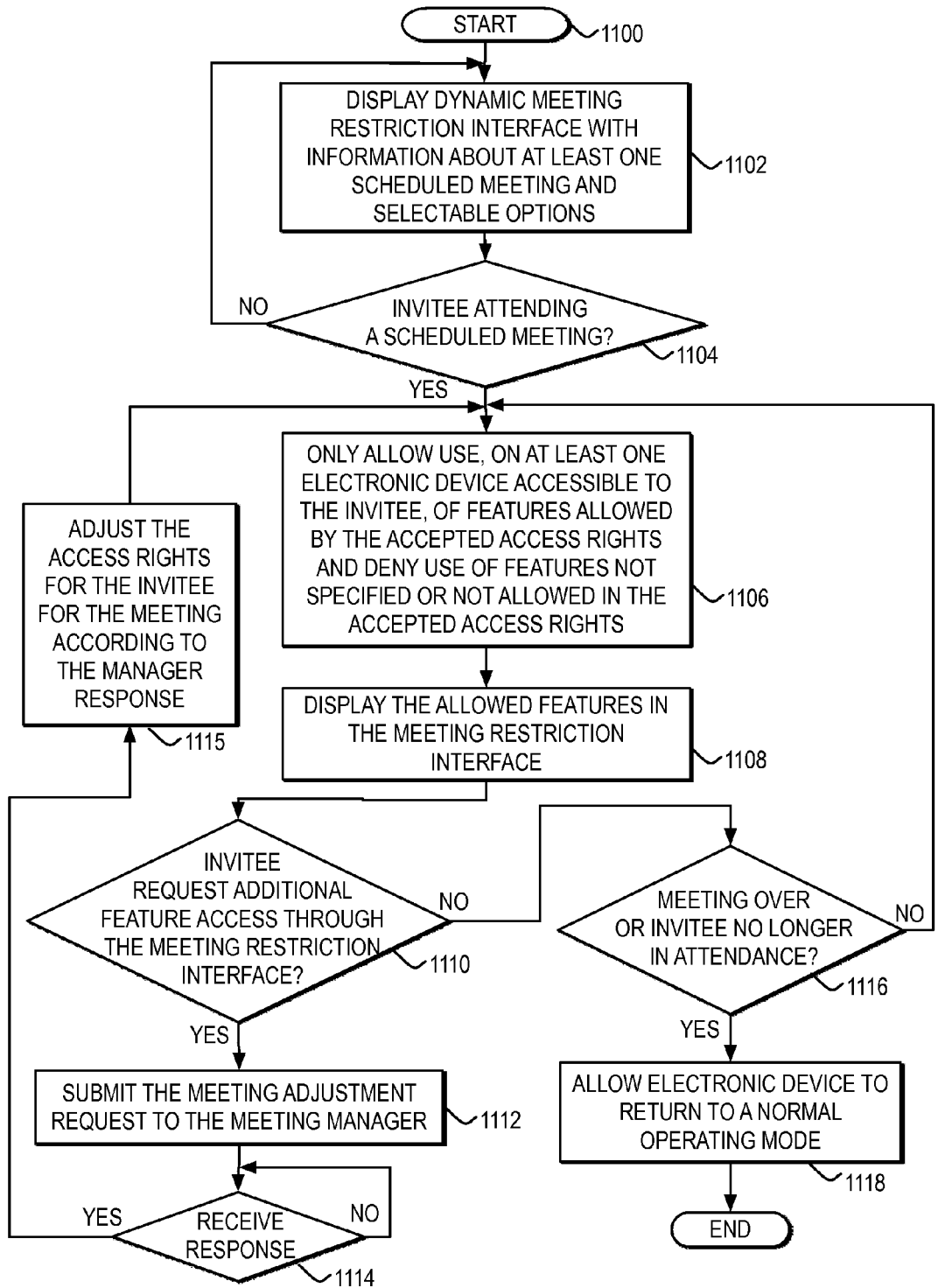
FIG. 11 is a high level logic flowchart illustrating a process and program for managing invitee acceptance of meeting requests with access rights for controlling use of an electronic device by the invitee during the meeting.

Referring now to FIG. 11, a high level logic flowchart depicts a process and program for managing invitee acceptance of meeting requests with access rights for controlling use of an electronic device by the invitee during the meeting. In the example, the process starts at block 1000 and thereafter proceeds to block 1002. Block 1002 illustrates displaying a dynamic meeting restriction interface with information about at least one scheduled meeting and selectable options. Next, block 1004 depicts a determination whether an invitee is attending a scheduled meeting. If an invitee is attending a scheduled meeting, then the process passes to block 1106.

Block 1106 illustrates only allowing use, on at least one electronic device accessible to the invitee, of features allowed by the accepted access rights for the meeting and denying or disallowing use of features not specified or not allowed in the accepted access rights. Next, block 1108 depicts displaying the allowed features in the meeting restriction interface, and the process passes to block 1110.

Block 1110 illustrates a determination whether the invitee requests additional feature access during the meeting through the meeting restriction interface. If the invitee requests additional features, then the process passes to block 1112. Block 1112 depicts submitting the meeting adjustment request to the meeting manager. Next, block 1114 illustrates a determination whether a response to the request is received. If a response is received or a timeout occurs from waiting, then the process passes to block 1115. Block 1115 depicts adjusting the access rights for the invitee for the meeting according to the received response, and the process returns to block 1106.

Returning to block 1110, if the invitee does not request additional features, then the process passes to block 1116. Block 1116 depicts a determination whether a meeting is over or the invitee is no longer in attendance. If a meeting is not yet over or the invitee is still in attendance, then the process returns to block 1106. Once the meeting is over or the invitee is no longer in attendance, then the process passes to block 1118. Block 1118 depicts allowing the electronic device to return to a normal operating mode or deactivating the electronic device use controller, and the process ends.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising", when used in this specification specify the presence of stated features, integers, steps, operations, elements, and/or components, but not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the one or more embodiments of the invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

While the invention has been particularly shown and described with reference to one or more embodiments, it will be understood by those skilled in the art that various changes in form and detail may be made therein without departing from the spirit and scope of the invention.

What is claimed is:

1. A method in at least one computer system for providing controlled access to the use of an electronic device, comprising:

receiving a meeting request for a meeting with at least one invitee, wherein the meeting request specifies access rights to use only at least one particular feature of a plurality of features of an electronic device accessible to the at least one invitee during a scheduled time for the meeting and to block use of a remaining selection of features of the plurality of features of the electronic device;

responsive to receiving, at the electronic device, the meeting request, scanning the at least one electronic device associated with the at least one invitee to identify the plurality of features by requesting a configuration file from an operating system of the at least one electronic device and detecting the plurality of features of the electronic device from the configuration file, wherein the plurality of features comprise at least one hardware feature, at least one network feature, and at least one application feature;

comparing, by the electronic device, the plurality of features with a selection of features specified for control by the access rights;

identifying, by the electronic device, a first selection of features from among the selection of features matching the plurality of features, wherein the first selection of features are allowed for use during the meeting according to the access rights and a second selection of features from among the selection of features matching the plurality of features, wherein the second selection of features are disallowed from use during the meeting according to the access rights;

displaying, by the electronic device, the first selection of features and the second selection of features in a meeting invitee interface;

displaying, by the electronic device, within the meeting invitee interface, a first selectable option for the at least one invitee to accept the access rights and meeting request;

displaying, by the electronic device, within the meeting invitee interface, a second selectable option for the at least one invitee to select at least one particular feature from among the second selection of features to request to add to the first selection of features;

responsive to the at least one invitee selecting the second selectable option and selecting the at least one particular feature, sending a request to a meeting manager for additional access rights with the at least one particular feature;

responsive to receiving a response from the meeting manager at the electronic device affirming the additional access rights, removing the at least one particular feature from the second selection of features, adding the at least one particular feature to the first selection of features, updating the display of the second selection of features to remove the at least one particular feature, and updating the display of the first selection of features to add the at least one particular feature;

responsive to the at least one invitee selecting the first selectable option to accept the meeting request, downloading, by the electronic device, a module specified by the meeting manager and required to be installed on the electronic device to enforce the access rights during the scheduled time for the meeting if the at least one invitee is detected as physically present at a particular location for the meeting, wherein the module is a controller;

installing, by the electronic device, the module on the electronic device;

detecting, by the module, from one or more input interfaces of the electronic device, whether the at least one invitee is currently physically present in the particular location for the meeting during the scheduled time for the meeting, wherein the electronic device is accessible to the invitee during the meeting and the electronic device is not used by the at least one invitee to connectively access the meeting;

responsive to the module detecting the at least one invitee is currently physically present in the particular location for the meeting during the scheduled time for the meeting, activating the module to configure the electronic device to only provide access during the scheduled time for the meeting to the at least one particular feature of the electronic device allowed in the access rights specified in the accepted meeting request; and controlling, by the module, the electronic device to only allowing use of the at least one particular feature of the electronic device by the at least one invitee during the scheduled time for the meeting and blocking use of the at least one remaining features of the plurality of features of the electronic device not allowed in the access rights during the scheduled time for the meeting.

2. The method according to claim 1, further comprising:
displaying an interface comprising a selectable option for a user to request adjustment of the access rights to comprise at least one additional feature from among said plurality of features during the scheduled meeting, independent of which of said plurality of features are already included in the access rights.

3. The method according to claim 1, further comprising:
during the meeting specified by the meeting request, receiving a request from the at least one invitee for use of a particular feature not allowed by the access rights from among the plurality of features; and responsive to a meeting administrator authorizing use of the particular feature during the meeting, adjusting the access rights for the electronic device to allow use of the particular feature not allowed.

4. The method according to claim 1, wherein sending a meeting request for a meeting to at least one invitee, further comprises:
sending the meeting request specifying access rights for controlling at least one of at least one network use feature from among the plurality of features of the electronic device, at least one application from among the plurality of features of the electronic device, and at least one hardware element from among the plurality of features of the electronic device.

5. The method according to claim 1, further comprising:
responsive to detecting the at least one invitee physically leaving the particular location for the meeting, automatically disabling the module from controlling use of the plurality of features of the electronic device.

6. The method according to claim 1, further comprising:
receiving the meeting request specifying access rights to use only at least one particular feature of the plurality of features of a plurality of separate electronic devices accessible to the invitee during the scheduled time for the meeting;

in response to the at least one invitee accepting the meeting request, automatically configuring each separate electronic device from among the plurality of separate electronic devices to only provide access during the scheduled time for the meeting to the at least one particular feature allowed in the access rights specified in the accepted meeting request;

only allowing use of the at least one particular feature of each separate electronic device from among the plurality of separate electronic devices by the at least one invitee during the scheduled time for the meeting and denying use of the selection of features of the plurality of features not allowed in the access rights of each separate electronic device.

7. A system for providing controlled access to the use of an electronic device, comprising:

one or more processors, one or more computer-readable memories, and one or more computer-readable, tangible storage devices;

program instructions, stored on at least one of the one or more storage devices for execution by at least one of the one or more processors via at least one of the one or more memories, to receive a meeting request for a meeting with at least one invitee, wherein the meeting request specifies access rights to use only at least one particular feature of a plurality of features of an electronic device accessible to the at least one invitee during a scheduled time for the meeting and to block use of a remaining selection of features of the plurality of features of the electronic device;

program instructions, stored on at least one of the one or more storage devices for execution by at least one of the one or more processors via at least one of the one or more memories, to scan the at least one electronic device associated with the at least one invitee to identify the plurality of features by requesting a configuration file from an operating system of the at least one electronic device and detecting the plurality of features of the electronic device from the configuration file, wherein the plurality of features comprise at least one hardware feature, at least one network feature, and at least one application feature;

program instructions, stored on at least one of the one or more storage devices for execution by at least one of the one or more processors via at least one of the one or more memories, to compare the plurality of features with a selection of features specified for control by the access rights;

program instructions, stored on at least one of the one or more storage devices for execution by at least one of the one or more processors via at least one of the one or more memories, to identify a first selection of features from among the selection of features matching the plurality of features, wherein the first selection of features are allowed for use during the meeting according to the access rights and a second selection of features from among the selection of features matching the plurality of features, wherein the second selection of features are disallowed from use during the meeting according to the access rights;

program instructions, stored on at least one of the one or more storage devices for execution by at least one of the one or more processors via at least one of the one or more memories, to display the first selection of features and the second selection of features in a meeting invitee interface; program instructions, stored on at least one of the one or more storage devices for execution by at least one of the one or more processors via at least one of the one or more memories, to display, within the meeting invitee interface, a first selectable option for the at least one invitee to accept the access rights and meeting request;

program instructions, stored on at least one of the one or more storage devices for execution by at least one of the one or more processors via at least one of the one or more memories, to display, within the meeting invitee interface, a second selectable option for the at least one invitee to select at least one particular feature from among the second selection of features to request to add to the first selection of features;

program instructions, stored on at least one of the one or more storage devices for execution by at least one of the one or more processors via at least one of the one or more memories, responsive to the at least one invitee selecting the second selectable option and selecting the at least one particular feature, to send a request to a meeting manager for additional access rights with the at least one particular feature;

program instructions, stored on at least one of the one or more storage devices for execution by at least one of the one or more processors via at least one of the one or more memories, responsive to receiving a response from the meeting manager at the electronic device affirming the additional access rights, to remove the at least one particular feature from the second selection of features, add the at least one particular feature to the first selection of features, update the display of the second selection of features to remove the at least one particular feature, and update the display of the first selection of features to add the at least one particular feature to add the at least one particular feature;

program instructions, stored on at least one of the one or more storage devices for execution by at least one of the one or more processors via at least one of the one or more memories, in response to the at least one invitee selecting the first selectable option to accept the meeting request, to download a module specified by the meeting manager and required to be installed on the electronic device to enforce the access rights during the scheduled time for the meeting if the at least one invitee is detected as physically present at a particular location for the meeting, wherein the module is a controller;

program instructions, stored on at least one of the one or more storage devices for execution by at least one of the one or more processors via at least one of the one or more memories, to install the module on the electronic device;

program instructions, stored on at least one of the one or more storage devices for execution by at least one of the one or more processors via at least one of the one or more memories, to detect, by the module, from one or more input interfaces of the electronic device whether the at least one invitee is currently physically present in the particular location for the meeting during the scheduled time for the meeting, wherein the electronic device is accessible to the invitee during the meeting and the electronic device is not used by the at least one invitee to connectively access the meeting;

program instructions, stored on at least one of the one or more storage devices for execution by at least one of the one or more processors via at least one of the one or more memories, responsive to the module detecting the at least one invitee is currently physically present in the particular location for the meeting during the scheduled time for the meeting, to active the module to configure the electronic device to only provide access during the scheduled time for the meeting to the at least one particular feature of the electronic device allowed in the access rights specified in the accepted meeting request; and program instructions, stored on at least one of the one or more storage devices for execution by at least one of the one or more processors via at least one of the one or more memories, to control, by the module, the electronic device to only allow use of the at least one particular feature of the electronic device during the scheduled time for the meeting and blocking use of the at least one remaining features of the plurality of features of the electronic device not allowed in the access rights during the scheduled time for the meeting.

8. The system according to claim 7, further comprising:
program instructions, stored on at least one of the one or more storage devices for execution by at least one of the one or more processors via at least one of the one or more memories, to display an interface comprising a selectable option for a user to request adjustment of the access rights to comprise at least one additional feature from among said plurality of features during the scheduled meeting, independent of which of said plurality of features are already included in the access rights.

9. The system according to claim 7, further comprising:
program instructions, stored on at least one of the one or more storage devices for execution by at least one of the one or more processors via at least one of the one or more memories, during the meeting specified by the meeting request, to receive a request from the at least one invitee for use of a particular feature not allowed by the access rights from among the plurality of features; and program instructions, stored on at least one of the one or more storage devices for execution by at least one of the one or more processors via at least one of the one or more memories, responsive to a meeting administrator authorizing use of the particular feature during the meeting, to adjust the access rights for the electronic device to allow use of the particular feature not allowed.

10. The system according to claim 7, wherein program instructions, stored on at least one of the one or more storage devices for execution by at least one of the one or more processors via at least one of the one or more memories, to send a meeting request for a meeting to at least one invitee, further comprises:
program instructions, stored on at least one of the one or more storage devices for execution by at least one of the one or more processors via at least one of the one or more memories, to send the meeting request specifying access rights for controlling at least one of at least one network use feature from among the plurality of features of the electronic device, at least one application from among the plurality of features of the electronic device, and at least one hardware element from among the plurality of features of the electronic device.

11. The system according to claim 7, further comprising:
program instructions, stored on at least one of the one or more storage devices for execution by at least one of the one or more processors via at least one of the one or more memories, responsive to detecting the at least one invitee physically leaving the particular location for the meeting, to automatically disable the module from controlling use of the plurality of features of the at least one electronic device.

12. The system according to claim 7, further comprising:
the meeting manager operative to send the meeting request specifying access rights to use only at least one particular feature of the plurality of features of a plurality of separate electronic devices accessible to the invitee during the scheduled time for the meeting;

the meeting manager, in response to the at least one invitee accepting the meeting request, operative to automatically configure each separate electronic device from among the plurality of separate electronic devices to only provide access during the scheduled time for the meeting to the at least one particular feature allowed in the access rights specified in the accepted meeting request;

the meeting manager operative to only allow use of the at least one particular feature of each separate electronic device from among the plurality of separate electronic devices by the at least one invitee during the scheduled time for the meeting and denying use of the selection of features of the plurality of features not allowed in the access rights of each separate electronic device.

13. A computer program product for providing controlled access to the use of an electronic device, the computer program product comprising:

a non-transitory computer-readable storage device having computer usable program code embodied therewith, the computer usable program code comprising:

computer usable program code configured to:

receive a meeting request for a meeting with at least one invitee, wherein the meeting request specifies access rights to use only at least one particular feature of a plurality of features of an electronic device accessible to the at least one invitee during a scheduled time for the meeting and to block use of a remaining selection of features of the plurality of features of the electronic device;

responsive to receiving the meeting request, scan the at least one electronic device associated with the at least one invitee to identify the plurality of features by requesting a configuration file from an operating system of the at least one electronic device and detecting the plurality of features of the electronic device from the configuration file, wherein the plurality of features comprise at least one hardware feature, at least one network feature, and at least one application feature;

compare the plurality of features with a selection of features specified for control by the access rights;

identify a first selection of features from among the selection of features matching the plurality of features, wherein the first selection of features are allowed for use during the meeting according to the access rights and a second selection of features from among the selection of features matching the plurality of features, wherein the second selection of features are disallowed from use during the meeting according to the access rights;

display the first selection of features and the second selection of features in a meeting invitee interface;

display, within the meeting invitee interface, a first selectable option for the at least one invitee to accept the access rights and meeting request;

display, within the meeting invitee interface, a second selectable option for the at least one invitee to select at least one particular feature from among the second selection of features to request to add to the first selection of features;

responsive to the at least one invitee selecting the second selectable option and selecting the at least one particular feature, send a request to a meeting manager for additional access rights with the at least one particular feature; and responsive to receiving a response from the meeting manager at the electronic device affirming the additional access rights, remove the at least one particular feature from the second selection of features, add the at least one particular feature to the first selection of features, update the display of the second selection of features to remove the at least one particular feature, and update the display of the first selection of features to add the at least one particular feature to add the at least one particular feature;

responsive to the at least one invitee selecting the first selectable option to accept the meeting request, download, by the electronic device, a module specified by the meeting manager and required to be installed on the electronic device to enforce the access rights during the scheduled time for the meeting if the at least one invitee is detected as physically present at a particular location for the meeting, wherein the module is a controller;

install, by the electronic device, the module on the electronic device;

detect, by the module, from one or more input interfaces of the electronic device, whether the at least one invitee is currently physically present in the particular location for the meeting during the scheduled time for the meeting, wherein the electronic device is accessible to the invitee during the meeting and the electronic device is not used by the at least one invitee to connectively access the meeting;

responsive to the module detecting the at least one invitee is currently physically present in the particular location for the meeting during the scheduled time for the meeting, activate the module to configure the electronic device to only provide access during the scheduled time for the meeting to the at least one particular feature of the electronic device allowed in the access rights specified in the accepted meeting request; and control, by the module, the electronic device to only allow use of the at least one particular feature of the electronic device during the scheduled time for the meeting and blocking use of the at least one remaining features of the plurality of features of the electronic device not allowed in the access rights during the scheduled time for the meeting.

14. The computer program product of claim 13, the computer usable program code further configured to:

display an interface comprising a selectable option for a user to request adjustment of the access rights to comprise at least one additional feature from among said plurality of features during the scheduled meeting, independent of which of said plurality of features are already included in the access rights.

* * * * *